United States Patent
Chae et al.

(10) Patent No.: US 9,667,891 B2
(45) Date of Patent: May 30, 2017

(54) IMAGE SENSOR

(71) Applicants: Min Ah Chae, Bucheon-si (KR); Hee Sung Shim, Gangneung-si (KR)

(72) Inventors: Min Ah Chae, Bucheon-si (KR); Hee Sung Shim, Gangneung-si (KR)

(73) Assignee: Dongbu HiTek Co., Ltd., Bucheon-Si (KR)

( * ) Notice: Subject to any disclaimer, the term of this patent is extended or adjusted under 35 U.S.C. 154(b) by 68 days.

(21) Appl. No.: 14/713,446

(22) Filed: May 15, 2015

(65) Prior Publication Data

US 2016/0037092 A1     Feb. 4, 2016

(30) Foreign Application Priority Data

Jul. 30, 2014   (KR) .................. 10-2014-0097110

(51) Int. Cl.
*H04N 5/347*     (2011.01)
*H04N 5/378*     (2011.01)

(52) U.S. Cl.
CPC ............ *H04N 5/347* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 6,888,568 B1 | 5/2005 | Neter | |
| 7,554,584 B2 | 6/2009 | Lim | |
| 7,609,303 B1* | 10/2009 | Lee | H04N 5/3575 348/241 |
| 2005/0185075 A1 | 8/2005 | Neter | |
| 2005/0206752 A1 | 9/2005 | Lim | |
| 2006/0038208 A1* | 2/2006 | Terzioglu | H04N 5/235 257/292 |
| 2010/0231773 A1* | 9/2010 | Fujimura | H04N 5/335 348/311 |
| 2013/0001402 A1* | 1/2013 | Ogushi | H04N 5/3456 250/208.1 |
| 2013/0147979 A1* | 6/2013 | McMahon | H04N 5/335 348/218.1 |

(Continued)

FOREIGN PATENT DOCUMENTS

KR     100994993     11/2010

OTHER PUBLICATIONS

Abstract of Korean Application No. 10-0994993; Nov. 11, 2010; "Solid State Image Sensing Device and Driving Method Thereof Outputting Digital Image Signals of Averaged Sub-Sampled Analog Signals"; 2 pgs.; http://engpat.kipris.or.kr.

(Continued)

*Primary Examiner* — Roberto Velez
*Assistant Examiner* — Quan Pham
(74) *Attorney, Agent, or Firm* — Andrew D. Fortney; Central California IP Group, P.C.

(57) ABSTRACT

Disclosed is an image sensor that includes a pixel array including a plurality of unit pixels in a matrix having rows and columns, a binning sampling unit configured to (i) amplify with different gains signals from unit pixels selected from the unit pixels in each of the columns, and (ii) output a binning sampling signal according to an average of the amplified signals, and an analog-to-digital converter configured to convert the binning sampling signal to a digital signal.

15 Claims, 6 Drawing Sheets

(56) References Cited

U.S. PATENT DOCUMENTS

2013/0242152 A1* 9/2013 Kasai ................... H04N 5/2353
                                                  348/294
2015/0296163 A1* 10/2015 Nakamura ............. H04N 5/378
                                                  348/308
2015/0326809 A1* 11/2015 Yamasaki .......... H04N 5/37452
                                                  348/300

OTHER PUBLICATIONS

Office Action dated May 15, 2015; Korean Patent Application No. 10-2014-0097110; 4 pgs.; Korean Intellectual Property Office, Republic of Korea.

* cited by examiner

| Gre | Gain | Switch Selection | | | | |
|---|---|---|---|---|---|---|
| | | Q1(Ca1) | Q2(Ca2) | Q3(Ca3) | Q4(Ca4) | Q5(Ca5) |
| High | - | H(On) | H(On) | H(On) | H(On) | H(On) |
| Low | g1 | H(On) | H(On) | H(On) | H(On) | H(On) |
| | g2 | H(On) | H(On) | L(Off) | H(On) | H(On) |
| | g3 | H(On) | H(On) | L(Off) | H(On) | L(Off) |
| | g4 | L(Off) | L(Off) | H(On) | L(Off) | L(Off) |
| | g5 | L(Off) | H(On) | H(On) | L(Off) | L(Off) |
| | g6 | H(On) | L(Off) | L(Off) | L(Off) | L(Off) |

IMAGE SENSOR

This application claims the benefit of Korean Patent Application No. 10-2014-0097110, filed on Jul. 30, 2014, which is hereby incorporated by reference as if fully set forth herein.

BACKGROUND OF THE INVENTION

Field of the Invention

Embodiments of the invention relate to an image sensor.

Discussion of the Related Art

Image sensors, in particular, complementary metal-oxide semiconductor (CMOS) image sensors, may include N×M unit pixels for one frame.

Such an image sensor may use a low resolution mode when it is necessary to increase the data processing rate (for example, in a moving image mode). In a low resolution mode, not all unit pixels may output a signal. In other words, only some of the unit pixels may output a signal. The low resolution mode of the image sensor may be implemented using a sub-sampling mode and a binning mode.

SUMMARY OF THE INVENTION

Embodiments of the invention provide an image sensor which does not require a separate line memory for binning after analog-to-digital conversion, while being capable of achieving an enhancement in the analog-to-digital conversion rate.

Additional advantages, objects, and features of various embodiments will be set forth in part in the description which follows and in part will become apparent to those skilled in the art upon examination of the following or may be learned from practice of one or more of the embodiments. The objectives and other advantages of the embodiments may be realized and attained by the structure(s) particularly pointed out in the written description and claims hereof as well as the appended drawings.

To achieve these objects and other advantages and in accordance with the purpose(s) of the embodiments, as embodied and broadly described herein, an image sensor may include a pixel array including a plurality of unit pixels in a matrix having rows and columns, a binning sampling unit configured to amplify, with different gains, signals from two unit pixels selected from the unit pixels in each of the columns, and output a binning sampling signal according to an average of the amplified signals, and an analog-to-digital converter configured to convert the binning sampling signal to a digital signal.

The two unit pixels may have the same color.

The signal from each of the selected unit pixels may be a reset sensing signal or an image sensing signal. The reset sensing signal may be a signal from the unit pixel when the unit pixel is reset. The image sensing signal may be a signal from the unit pixel in accordance with an image signal.

The binning sampling unit may include a gain-variable amplifier unit configured to amplify, with different gains, respective reset sensing signals and image sensing signals from the selected unit pixels, a first averaging unit configured to output a first binning sampling signal according to an average of the reset sensing signals amplified with the different gains, and a second averaging unit configured to output a second binning sampling signal according to an average of the image sensing signals amplified with the different gains.

The gain-variable amplifier unit may amplify, with a first gain, a first reset sensing signal and a first image sensing signal from a first one of the selected unit pixels, and may amplify, with a second gain, a second reset sensing signal and a second image sensing signal from a second one of the selected unit pixels. The first gain and the second gain may be different.

The gain-variable amplifier unit may include a primary amplifier configured to amplify the signals from the selected unit pixels and output primarily amplified signals, a first variable capacitor configured to receive the signals from the selected unit pixels, the first variable capacitor being connected to an input terminal of the primary amplifier, a secondary amplifier configured to amplify the primarily amplified signals and output secondarily amplified signals, and a second variable capacitor connected to the input terminal of the primary amplifier and an output terminal of the secondary amplifier. The first variable capacitor may receive the signals from the selected unit pixels at a first end or electrode, and be connected to the input terminal of the primary amplifier at a second end or electrode.

The gain-variable amplifier unit may further include a bandwidth varying unit configured to vary a bandwidth of the gain-variable amplifier unit.

The bandwidth varying unit may include a plurality of capacitors and a plurality of switches. Each of the capacitors may be connected at a first end or electrode to the output terminal of the secondary amplifier. A second end or electrode of each of the capacitors may be connected to a first node, which may be an output terminal of the primary amplifier and/or an input terminal of the secondary amplifier.

The bandwidth varying unit may further include a reset switch connected to the input terminal of the primary amplifier and the output terminal of the secondary amplifier.

The analog-to-digital converter may generate a digital signal using the first binning sampling signal and the second binning sampling signal.

In another aspect of the present invention, an image sensor may include a pixel array including a plurality of unit pixels in a matrix having rows and columns, a gain-variable amplifier unit configured to amplify with a first gain a first signal from a first one of two unit pixels selected from the unit pixels in each of the columns, and amplify with a second gain a second signal from a second one of the selected unit pixels, an averaging unit configured to calculate an average of the amplified first signal and the amplified second signal, and output a binning sampling signal (e.g., according to the calculation), and an analog-to-digital converter configured to convert the binning sampling signal to a digital signal, wherein the first gain and the second gain are different.

The gain-variable amplifier unit may include a primary amplifier configured to amplify the first signal or the second signal, a first variable capacitor configured to receive at a first end or electrode the first signal or the second signal, the first variable capacitor being connected at a second end or electrode to an input terminal of the primary amplifier, a secondary amplifier configured to amplify the amplified first signal or the amplified second signal, a second variable capacitor connected to the input terminal of the primary amplifier and an output terminal of the secondary amplifier, and a bandwidth varying unit configured to vary a bandwidth of the secondary amplifier.

The bandwidth varying unit may include a plurality of capacitors and a plurality of switches. Each of the capacitors may be connected at a first end or electrode to the output terminal of the secondary amplifier. Each of the capacitors may be connected to a second end or electrode and a first node, which can be an output terminal of the primary amplifier and/or an input terminal of the secondary amplifier.

The bandwidth varying unit may further include a bandwidth control signal generator configured to generate one or more bandwidth control signals to control the switches. The bandwidth control signal(s) may be based on a gain reset signal and/or a digital code.

The bandwidth control signal generator may include a light sensor configured to measure luminosity of input light and generate the digital code (e.g., according to the measurement), and logic (e.g., one or more logic gates) configured to perform a logic operation on the gain reset signal and the digital code, and generate a bandwidth control signal (e.g., according to the logic operation).

The bandwidth varying unit may further include a reset switch connected to the input terminal of the primary amplifier and the output terminal of the secondary amplifier, configured to reset the primary and secondary amplifiers (e.g., electrically connect or disconnect the input terminal of the primary amplifier and the output terminal of the secondary amplifier) in response to the gain reset signal.

In accordance with various embodiments, it may be unnecessary to provide a separate line memory for binning image signals after analog-to-digital conversion. It may also be possible to achieve an enhancement in the analog-to-digital conversion rate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain principle(s) of the invention. In the drawings.

DETAILED DESCRIPTION OF THE INVENTION

Figure 1:
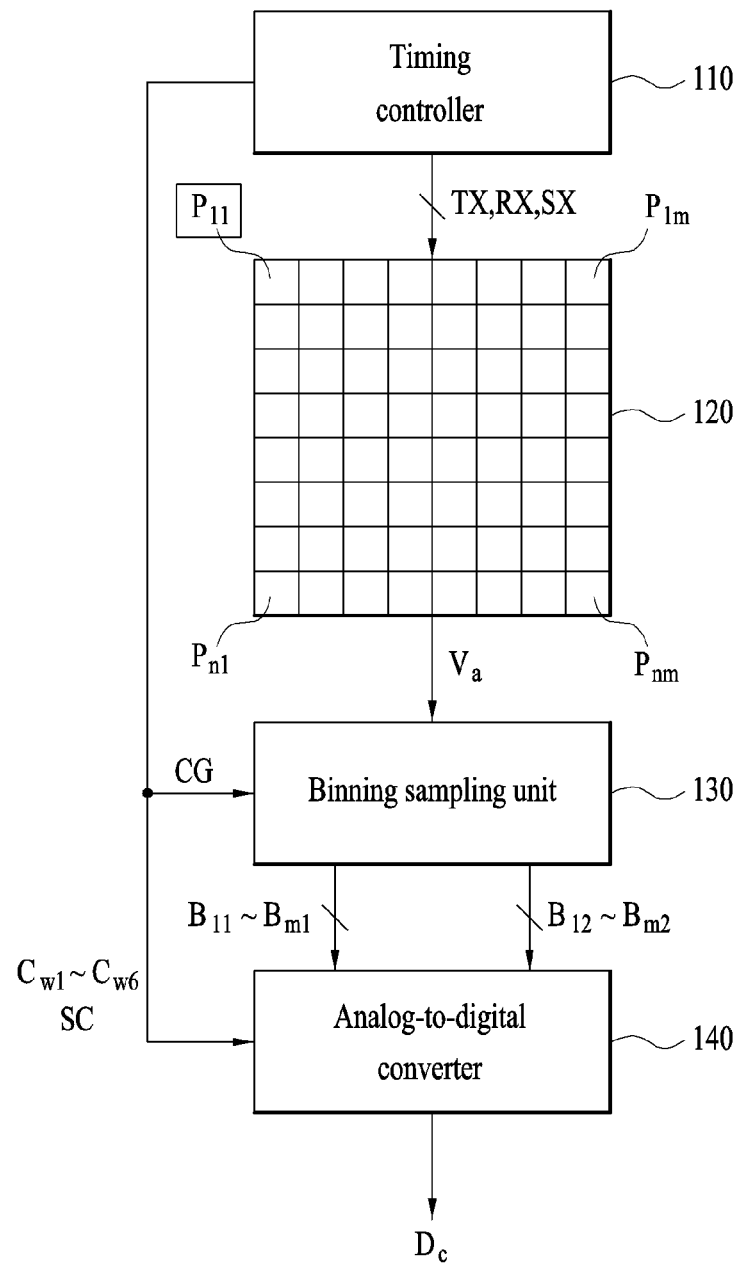
FIG. 1 is a block diagram of an image sensor according to one or more embodiments.

Hereinafter, embodiments will be described in detail with reference to the annexed drawings for better understanding. In the following description of the embodiments, it will be understood that, when an element such as a layer (or film), region, pattern, or structure is referred to as being "on" or "under" another element, it can be directly on or under the other element, or an intervening element may also be present. In addition, terms such as "on" or "under" should be understood on the basis of the drawings.

In the drawings, dimensions of layers may be exaggerated, omitted or schematically illustrated for clarity and convenience of description. In addition, dimensions of constituent elements do not necessarily reflect actual dimensions thereof. The same reference numerals denote the same constituent elements.

Figure 2:
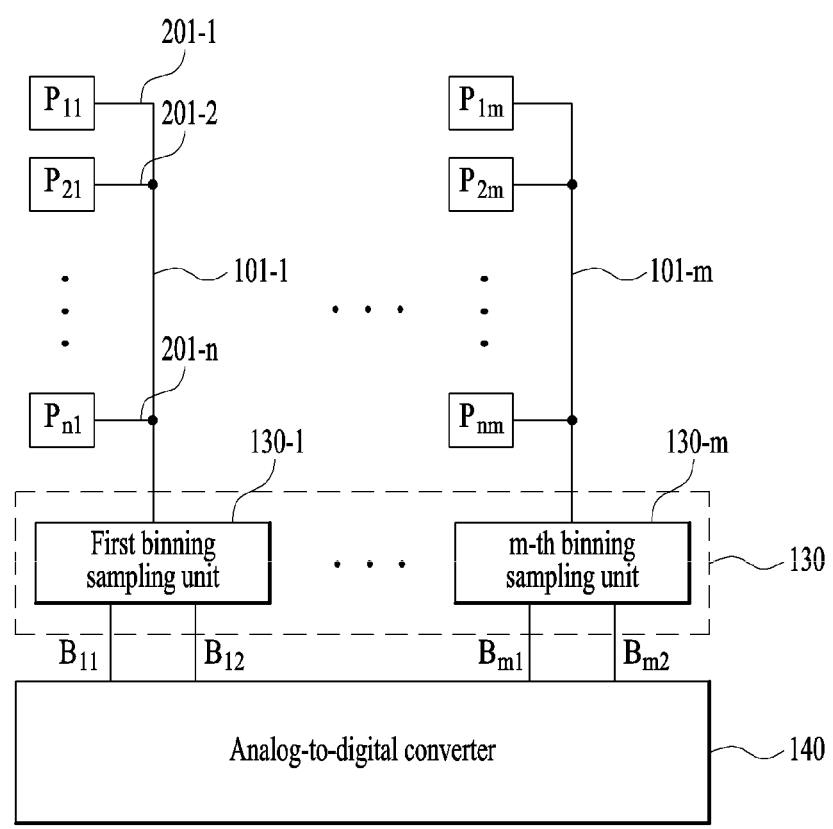
FIG. 2 is a diagram illustrating embodiments of an exemplary pixel array, an exemplary binning sampling unit, and an exemplary analog-to-digital converter suitable for the image sensor illustrated in FIG. 1.

FIG. 1 is a block diagram of an exemplary image sensor according to one or more embodiments. FIG. 2 illustrates embodiments of an exemplary pixel array 120, an exemplary binning sampling unit 130, and an exemplary analog-to-digital converter 140 suitable for the image sensor illustrated in FIG. 1.

Referring to FIGS. 1 and 2, an image sensor 100 includes a timing controller 110, a pixel array 120, a binning sampling unit 130, and an analog-to-digital converter 140.

The timing controller 110 outputs control signals (for example, a reset signal RX, a transfer signal TX, and a selection signal SX) that control operations of pixels in the pixel array 120, a gain control signal CG (e.g., that controls a gain of the binning sampling unit 130), and switch control signals CW1 to CW6 and one or more control signals SC that control the analog-to-digital converter 130.

The pixel array 120 may include a plurality of unit pixels P11 to Pnm (m and n being natural numbers greater than 1). The unit pixels P11 to Pnm may be in a matrix having rows and columns. Each of the unit pixels P11 to Pnm may include a photovoltaic element, such as a photodiode.

The pixel array 120 may include sensing lines 101-1 to 101-m each connected to one or more output stages of a corresponding column of the unit pixels P11 to Pnm.

The binning sampling unit 130 calculates an average of outputs of two or more unit pixels selected from the unit pixels P11 to Pn1, P12 to Pn2, or P1m to Pnm in each column of the pixel array 120.

The selected unit pixels may have the same exposure time. That is, outputs of the selected unit pixels may be outputs according to the same exposure time.

Here, the exposure time of each unit pixel may be a period from the time when a reset operation on a photodiode in the unit pixel is completed to a time when charges generated by light received by the photodiode are transferred to a floating diffusion region of the unit pixel.

The binning sampling unit 130 may include first to m-th binning sampling units 130-1 to 130-m (m being a natural number greater than 1, and which, in some embodiments, is equal to the number of columns in the pixel array 120) connected to respective sensing lines 101-1 to 101-m.

For example, each of the first to m-th binning sampling units 130-1 to 130-*m* may be connected to a corresponding one of the sensing lines 101-1 to 101-*m*.

For example, each of the first to m-th binning sampling units 130-1 to 130-*m* may calculate an average of the outputs of two unit pixels selected from the unit pixels (e.g., P11 to Pn1, P12 to Pn2, or P1m to Pnm) in a corresponding column of the pixel array 120 via a corresponding one of the sensing lines 101-1 to 101-*m*.

The two or more unit pixels selected for binning may have the same color. In one embodiment, the selected unit pixels may be blue pixels, red pixels, or green pixels.

Signals from the selected unit pixels may be reset sensing signals or image sensing signals. In this case, the reset sensing signals may be signals from the unit pixels when the unit pixels are reset. The image sensing signals may be output from the unit pixels based on charges from the photodiodes of the unit pixels (e.g., in accordance with an image signal or a video signal from the unit pixels).

Each of the first to m-th binning sampling units 130-1 to 130-*m* (m being a natural number greater than 1) may output a first binning sampling signal B11, B21 . . . Bm1 based on an average of the reset sensing signals from the corresponding selected unit pixels.

In addition, each of the first to m-th binning sampling units 130-1 to 130-*m* (m being a natural number greater than 1) may output a second binning sampling signal B12, B22 . . . Bm2 based on an average of the image sensing signals from the corresponding selected unit pixels.

The first to m-th binning sampling units 130-1 to 130-*m* (m being a natural number greater than 1) may have the same configuration.

Figure 3:
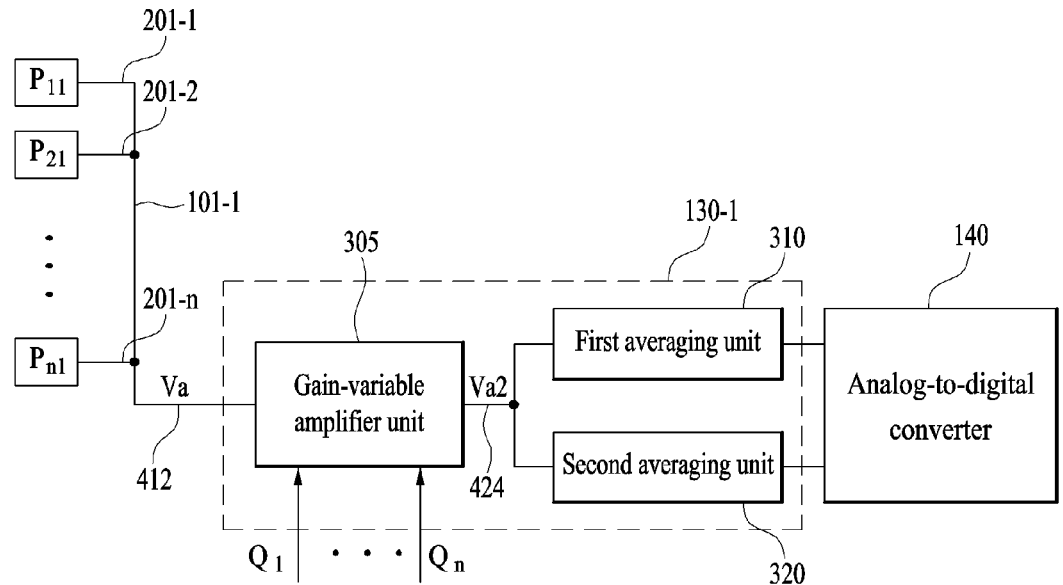
FIG. 3 is a diagram illustrating one or more embodiments of an exemplary first binning sampling unit suitable for the image sensor illustrated in FIG. 2.

FIG. 3 illustrates one or more embodiments of the first binning sampling unit 130-1 illustrated in FIG. 2.

Referring to FIG. 3, the first binning sampling unit 130-1 includes gain-variable amplifier unit 305, a first averaging unit 310 and a second averaging unit 320.

The gain-variable amplifier unit 305 may have an input terminal 331 connected to output stages of a plurality of unit pixels in a corresponding column of the pixel array, for example, output stages (or nodes) 201-1 to 201-*n*. For example, the input terminal 331 of the gain-variable amplifier unit 305 may be connected to a corresponding one of the sensing lines 101-1 to 101-*m* (in the specific case of the first binning sampling unit 130-1, the sensing line 101-1).

In response to gain control signals Q1 to Qn (n being a natural number greater than 1), the gain-variable amplifier unit 305 may amplify the signals from two or more unit pixels selected from the unit pixels P11 to Pn1, P12 to Pn2, or P1m to Pnm in a corresponding column of the pixel array 120 with different gains.

Figure 5:
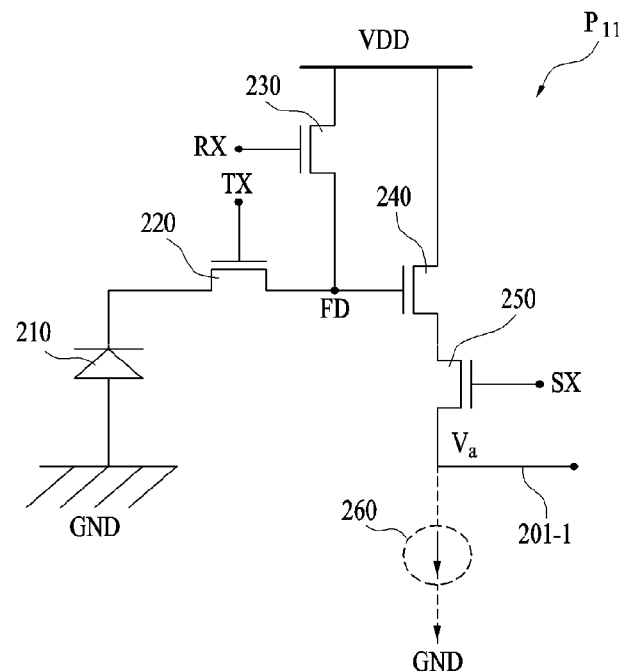
FIG. 5 is a circuit diagram of an exemplary unit pixel suitable for the image sensor illustrated in FIG. 1.

The gain-variable amplifier unit 305 may amplify reset sensing signals and image sensing signals from two or more unit pixels selected from the unit pixels in a corresponding column of the pixel array 120 with different gains. For example, the number of the selected unit pixels may be two. In this case, the selected unit pixels may have the same color. Also, the selected unit pixels may be amplified sequentially by the gain-variable amplifier unit 305 using, e.g., a pixel or row select signal SX (FIGS. 1 and 5).

Furthermore, the gain-variable amplifier unit 305 may amplify a first reset sensing signal and a first image sensing signal from the first unit pixel with a first gain, and may output the amplified first reset sensing signal and the amplified first image sensing signal.

In addition, the gain-variable amplifier unit 305 may amplify a second reset sensing signal and a second image sensing signal from the second unit pixel with a second gain, and may output the amplified second reset sensing signal and the amplified second image sensing signal.

The first gain and second gain may be different. For example, the ratio of the first gain to the second gain may be 3:1, although the present disclosure is not limited thereto.

The gain-variable amplifier unit 305 may be a programmable amplifier having a plurality of gains A1 to Ak.

When the first reset sensing signal or first image sensing signal from the first unit pixel is output to the first sensing line 101-1, the gain-variable amplifier unit 305 may set the gain thereof to the first gain. On the other hand, when the second reset sensing signal or second image sensing signal from the second unit pixel is output to the first sensing line 101-1, the gain-variable amplifier unit 305 may change the gain thereof to the second gain.

Alternatively, the gain-variable amplifier unit 305 may have a variable bandwidth (e.g., according to a predetermined frequency). In this case, the bandwidth may mean one of a plurality of frequencies corresponding to a unique gain, from a maximum gain value to a minimum gain value (e.g., according to frequency characteristics of amplifiers; in one example, the difference in adjacent gain values is 3 dB, and the number of unique gains is two).

Figure 6:
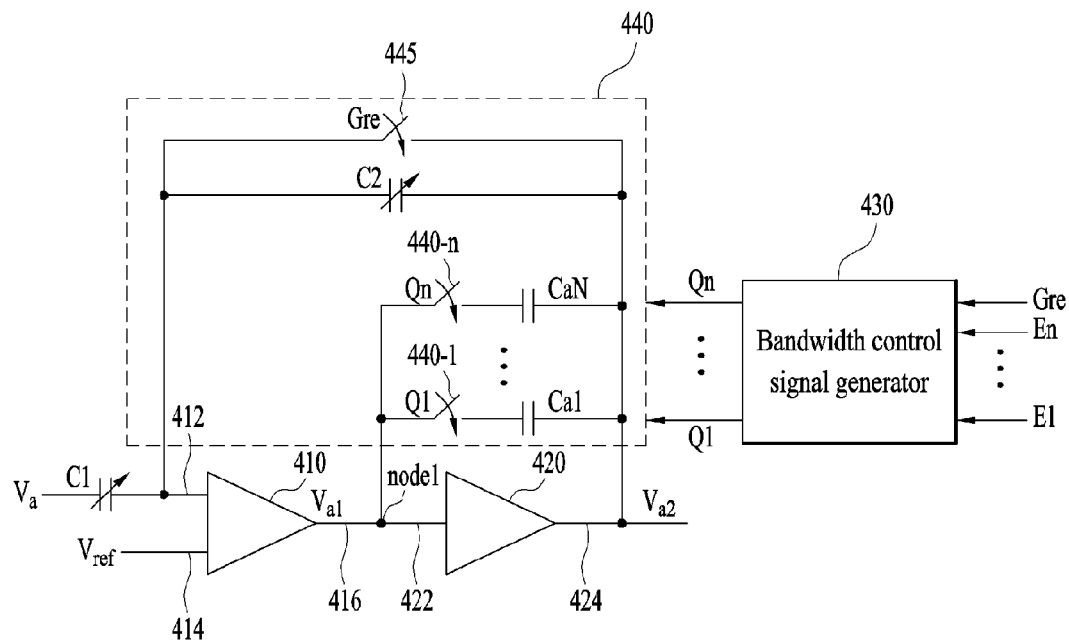
FIG. 6 is a diagram illustrating one or more embodiments of an exemplary gain-variable amplifier unit suitable for the exemplary binning sampling unit illustrated in FIG. 3.
Figure 7:
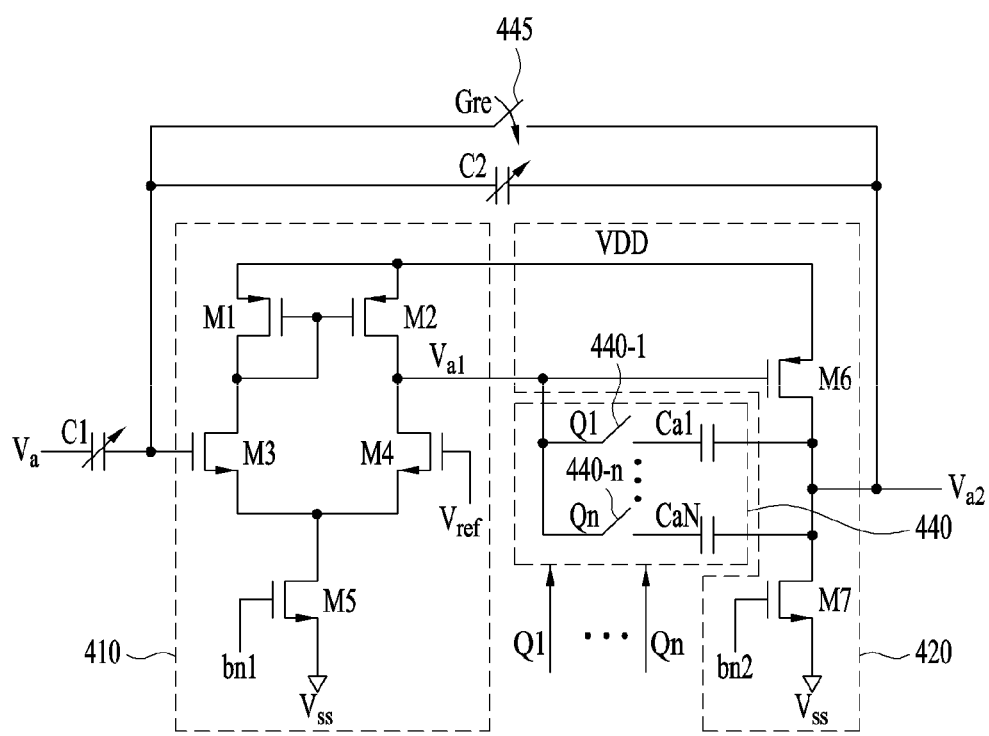
FIG. 7 is a diagram illustrating embodiments of exemplary primary and secondary amplifiers suitable for the gain-variable amplifier unit illustrated in FIG. 6.

FIG. 6 illustrates one or more embodiments of the gain-variable amplifier unit 305 illustrated in FIG. 3. FIG. 7 illustrates embodiments of primary and secondary amplifiers 410 and 420 illustrated in FIG. 6.

Referring to FIGS. 6 and 7, the gain-variable amplifier unit 305 includes a first variable capacitor C1, a second variable capacitor C2, the primary amplifier 410, the second primary amplifier 420, a bandwidth control signal generator 430, and a bandwidth varying unit 440.

The gain of the gain-variable amplifier unit 305 may vary in accordance with capacitance values of the first and second variable capacitors C1 and C2.

The first variable capacitor C1 receives at a first end or electrode signals from two or more unit pixels selected from the unit pixels in a corresponding column of the pixel array 120. The first variable capacitor C1 is connected at a second end or electrode to an input stage of the primary amplifier 410.

The capacitance of the first variable capacitor C1 may be varied. For example, the first variable capacitor C1 may be connected to the first sensing line 101-1 and to a first input terminal 412 of the primary amplifier 410.

The primary amplifier 410 amplifies a signal Va from the first sensing line 101-1 via the first variable capacitor C1, and outputs an amplified signal Va1.

The first input terminal 412 of the primary amplifier 410 receives the signal Va from the first sensing line 101-1 via the first variable capacitor C1. In addition to the first input terminal 412, the primary amplifier 410 may include a second input terminal 414 configured to receive a reference voltage, and a first output terminal 416, which outputs the amplified signal Va1.

For example, the primary amplifier 410 may comprise a differential amplifier that receives the signal Va received from the first sensing line 101-1 and a reference voltage Vref, and outputs the signal Va1.

For example, referring to FIG. 7, the primary amplifier 410 may be a differential amplifier including first to fifth transistors M1 to M5.

A first voltage VDD may be supplied to the sources of the first and second transistors M1 and M2. The gates of the first and second transistors M1 and M2 may be connected. The gate of the first transistor M1 may be connected to the drain of the first transistor M1.

A first source/drain terminal of the third transistor M3 may be connected to the drain of the first transistor M1. A first source/drain terminal of the fourth transistor M4 may be connected to the drain of the second transistor M2. The signal Va applied to the first sensing line 101-1 may be input to the gate of the third transistor M3. The reference voltage Vref may be input to the gate of the fourth transistor M4.

A second source/drain terminal of the third transistor M3 may be connected to a second source/drain terminal of the fourth transistor M4. A first source/drain terminal of the fifth transistor M5 may be connected to the second source/drain terminals of the third and fourth transistors M3 and M4. A first bias signal bn1 (which may be supplied from the timing controller 110) may be input to the gate of the fifth transistor M5, so that the fifth transistor M5 may function as a current source. A second voltage Vss may be supplied to a second source/drain terminal of the fifth transistor M5.

The secondary amplifier 420 may comprise a cascade amplifier that amplifies the amplified signal Va1 and outputs a second amplified signal Va2.

The secondary amplifier 420 may include an input terminal 422 connected to the output terminal 416 of the primary amplifier 410, and an output terminal 424 configured to output the signal Va2.

For example, the secondary amplifier 420 may include a sixth transistor M6 and a seventh transistor M7.

The first voltage VDD may be supplied to the source of the sixth transistor M6. The gate of the sixth transistor M6 may be connected to the drain of the second transistor M2 and the first source/drain terminal of the fourth transistor M4. Accordingly, the signal Va1 amplified by the primary amplifier 410 may be input to the gate of the sixth transistor M6.

A first source/drain terminal of the seventh transistor M7 may be connected to the drain of the sixth transistor M6. A second bias signal bn2 (which may be supplied by the timing controller 110 and which may be the same as or different from the first bias signal bn1) may be input to the gate of the seventh transistor M76. The fifth transistor M5 may therefore function as a current source. The second voltage Vss may be supplied to a second source/drain terminal of the seventh transistor M7.

The second variable capacitor C2 is connected to the input stage of the primary amplifier 410 and the output stage of the secondary amplifier 420. For example, the second variable capacitor C2 may be connected to the first input terminal 412 of the primary amplifier 410 and the output terminal 424 of the secondary amplifier 420. The capacitance of the second variable capacitor C2 may vary.

A reset switch 445 is also connected to the first input terminal 412 of the primary amplifier 410 and the output terminal 424 of the secondary amplifier 420 in parallel with the second variable capacitor C2. The reset switch 445 connects or disconnects the first input terminal 412 of the primary amplifier 410 and the output terminal 424 of the secondary amplifier 420 in response to a gain reset signal Gre from the timing controller 110.

The reset switch 445 is open when the gain reset signal Gre has a first state and is closed when the gain reset signal Gre has a second state. When at least one of the first and second variable capacitors C1 and C2 varies in capacitance, the gain of the gain-variable amplifier unit 305 may change or vary.

When the reset switch 445 is closed by the gain reset signal Gre, the gain of the gain-variable amplifier unit 305 may be reset.

The gain of the gain-variable amplifier unit 305 may vary in accordance with capacitance variations of the first and second variable capacitors C1 and C2. Each of the first and second variable capacitors C1 and C2 may have different capacitance values when amplifying a first signal from a first pixel and a second signal from a second pixel, respectively.

Here, the first signal may be a signal from one of two or more unit pixels (hereinafter, referred to as a "first unit pixel") selected from the unit pixels P11 to Pn1 (n being a natural number greater than 1) connected to the first sensing line 101-1. The second signal may be a signal from a second of the selected unit pixels (hereinafter, referred to as a "second unit pixel").

The bandwidth control signal generator 430 generates bandwidth control signals Q1 to Qn (n being a natural number greater than 1; in one embodiment, n is equal to the number of rows in the pixel array 120), based on the gain reset signal Gre from the timing controller 110 and digital codes E1 to En.

Figures 8, 9:
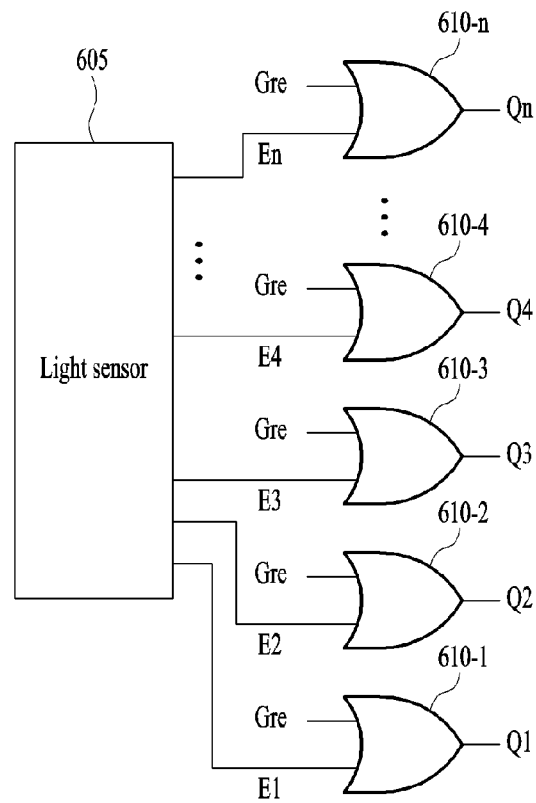
FIG. 8 is a diagram illustrating one or more embodiments of an exemplary bandwidth control signal generator suitable for use with the gain-variable amplifier unit illustrated in FIG. 6.
FIG. 9 is a table illustrating exemplary bandwidth control signals generated by the bandwidth control signal generator illustrated in FIG. 8 and gains of the gain-variable amplifier unit illustrated in FIG. 6 according to the bandwidth control signals.

FIG. 8 illustrates an embodiment of the bandwidth control signal generator 430 illustrated in FIG. 6.

Referring to FIG. 8, the bandwidth control signal generator 430 may include a light sensor 605 and a plurality of logic gates 610-1 to 610-n (n being a natural number greater than 1).

The light sensor 605 measures luminosity of light, and generates a digital code E1, E2, . . . En (n being a natural number greater than 1), for example according to a value of the measurement.

For example, the light sensor 605 may generate digital codes E1 to En (n being a natural number greater than 1) according to a luminosity of the light received by the light sensor 605 (e.g., through an auto exposure process).

Although the digital codes E1 to En (n being a natural number greater than 1) are generated by the light sensor 605 in the case of FIG. 8, such digital codes may be generated by an image signal processor, which processes image signal(s) (e.g., for an auto exposure process), color correction, and/or noise reduction functions, in other embodiments.

Each of the logic gates 610-1 to 610-n (n being a natural number greater than 1) performs a logic operation on the gain reset signal Gre from the timing controller 110 and a corresponding one of the digital codes E1 to En (n being a natural number greater than 1) from the light sensor 605, and generates a bandwidth control signal Q1, Q2, . . . Qn (n being a natural number greater than 1) according to the logic operation.

Each of the logic gates 610-1 to 610-n (n being a natural number greater than 1) may include at least one of an OR gate, an AND gate, and an XOR gate. For example, each of the logic gates 610-1 to 610-n (n being a natural number greater than 1) may be or comprise an OR gate, although the present invention is not limited thereto.

The gain-variable amplifier unit 305 may have a variable amplification gain in accordance with the luminosity of input light (e.g., to the image sensor). For example, the capacitance values of the first and second capacitors C1 and C2 in the gain-variable amplifier unit 305 may vary based on the digital codes E1 to En from the light sensor 605.

In addition, each of the bandwidth control signals Q1 to Qn (n being a natural number greater than 1) may select a bandwidth of the gain-variable amplifier unit 305 corresponding to the luminosity of the input light.

For example, the amplification gain of the gain-variable amplifier unit 305 may be determined in accordance with the luminosity of the light received by a light sensor. The bandwidth control signal generator 430 may generate a bandwidth control signal Q1, Q2, . . . Qn (n being a natural number greater than 1) based on the determined amplification gain. Based on the bandwidth control signal Q1, Q2, . . . Qn (n being a natural number greater than 1), the bandwidth varying unit 440 may vary or change the bandwidth of the gain-variable amplifier unit 305.

FIG. 9 illustrates exemplary bandwidth control signals Q1 to Q5 generated by the bandwidth control signal generator 430 illustrated in FIG. 8 and gains of the gain-variable amplifier unit 305 according or in response to the bandwidth control signals Q1 to Q5.

The number of capacitors Ca1 to CaN in the bandwidth varying unit 440 may be five (N=5). The number of switches 440-1 to 440-n) may be five (n=5). The number of logic gates in the bandwidth control signal generator 430 may be five. Of course, the present invention is not limited to such conditions, although the numbers of capacitors and switches in the bandwidth varying unit 440 and the number of logic gates in the bandwidth control signal generator 430 may all be identical to each other. Furthermore, the capacitance of each of the capacitors in the bandwidth varying unit 440 may be the same or different, and if different, the capacitance of the capacitors may be $C*2^N$ (where C is a unit capacitance value and n is the identification number of the capacitor Ca1 . . . CaN) to provide a digitally-programmable or—selectable capacitance.

Referring to FIG. 9, when the reset signal Gre has a first level, all of the bandwidth control signals Q1 to Q5 may have a first level and, as such, the switches 440-1 to 440n (n=5) may be turned on or closed. In this case, the gain of the gain-variable amplifier unit 305 may not be exhibited (e.g., the gain may be 1) due to turning on or closing the reset switch 445.

When the reset signal Gre has a second level (for example, a logic high or digital "1" state), the bandwidth control signals Q1 to Q5 may be determined by digital codes E1 to En (n=5) from the light sensor 605 or the analog-to-digital converter 140, respectively.

For example, the bandwidth of the gain-variable amplifier unit 305 may vary in accordance with the digital codes E1 to E5 (n=5). That is, the bandwidth control signals Q1 to Q5 may be determined in accordance with the luminosity of input light received by the image sensor and, as such, the gain-variable amplifier unit 305 may have one of a plurality of different bandwidths in accordance with variations in the luminosity of the input light.

In response to the reset signal Gre and the bandwidth control signals Q1 to Qn (n being a natural number greater than 1), the bandwidth varying unit 440 varies, changes or sets the bandwidth of the gain-variable amplifier unit 305.

In response to the bandwidth control signals Q1 to Qn (n being a natural number greater than 1), the total capacitance of the capacitors connected to the input and output stages of the secondary amplifier 420 may vary and, as such, the bandwidth of the gain-variable amplifier unit 305 may vary.

For example, as the bandwidth varying unit 440 varies the capacitance of the capacitors connected to the input and output stages of the secondary amplifier 420, the bandwidth of the secondary amplifier 420 varies. Accordingly, the bandwidth of the gain-variable amplifier unit 305 may be varied or changed.

The bandwidth varying unit 440 may include a plurality of capacitors Ca1 to Can (N being a natural number greater than 1), and a plurality of switches 440-1 to 440-n (n being a natural number greater than 1).

Each of the capacitors Ca1 to Can (N being a natural number greater than 1) may be connected at a first end or electrode to the output terminal 424 of the secondary amplifier 420.

Referring to FIG. 7, each of the capacitors Ca1 to Can (N being a natural number greater than 1) may be connected to a node to which a source/drain terminal of each of the sixth and seventh transistors M6 and M7 is connected.

Each of the switches 440-1 to 440-n (n being a natural number greater than 1) may be connected to a second end or electrode of a corresponding one of the capacitors Ca1 to Can (N being a natural number greater than 1) and a node node1, to which the first output terminal 416 of the primary amplifier 410 and the input terminal 422 of the secondary amplifier 420 are connected.

Referring to FIG. 7, the node node1 may be connected to the gate of the sixth transistor M6, the drain of the second transistor M2, and the first source/drain terminal of the fourth transistor M4.

Each of the switches 440-1 to 440-n (n being a natural number greater than 1) may connect or disconnect a capacitor Ca1 . . . CaN to the node node1 in response to a corresponding one of the bandwidth control signals Q1 to Qn (n being a natural number greater than 1) from the bandwidth control signal generator 430.

In response to the bandwidth control signals Q1 to Qn (n being a natural number greater than 1), some of the switches 440-1 to 440-n (n being a natural number greater than 1) may be turned on, and the remainder of the switches 440-1 to 440-n may be turned off. In accordance with turning the switches 440-1 to 440-n (n being a natural number greater than 1) on or off, the number of capacitors connected in parallel to the input and output terminals 422 and 424 of the secondary amplifier 420 may vary and, as such, the bandwidth of the gain-variable amplifier unit 305 may be controlled or selected.

The first averaging unit 310 may calculate or determine an average of the reset sensing signals from the selected unit pixels amplified with different gains by the gain-variable amplifier unit 305, and may generate a first binning sampling signal (e.g., according to the calculated or determined average).

The second averaging unit 320 may calculate an average of the image sensing signals from the selected unit pixels amplified with different gains by the gain-variable amplifier unit 305, and may generate a second binning sampling signal (e.g., according to the calculated or determined average).

Figure 4:
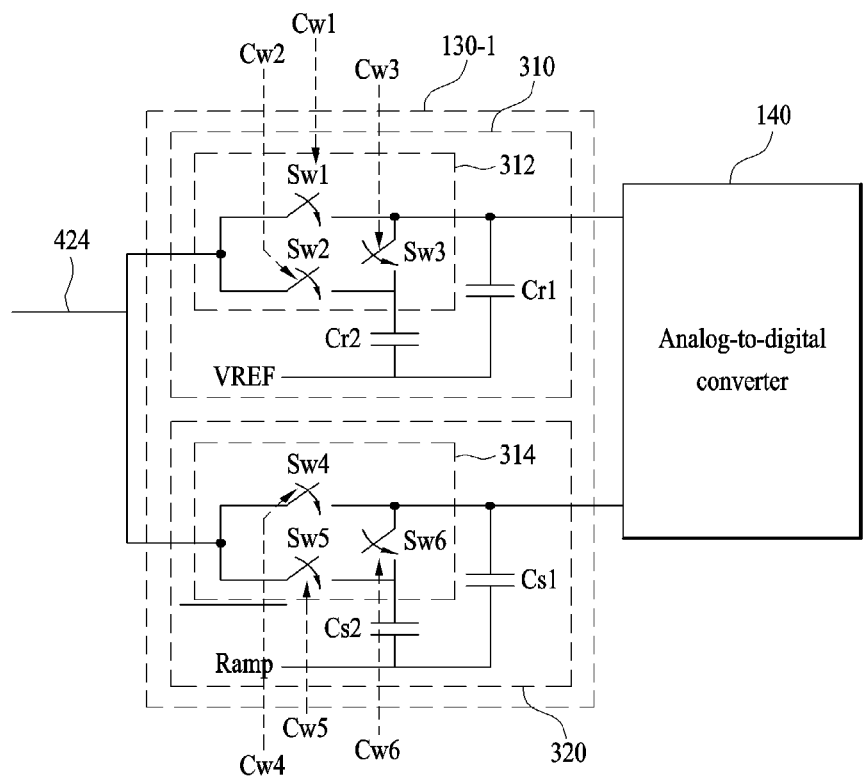
FIG. 4 is a diagram illustrating one or more embodiments of first and second averaging units suitable for the exemplary binning sampling unit illustrated in FIG. 3.

FIG. 4 illustrates embodiments of the first and second averaging units 310 and 320 illustrated in FIG. 3.

Referring to FIG. 4, the first averaging unit 310 includes a first capacitor Cr1, a second capacitor Cr2, and a first switching unit 312. The second averaging unit 320 includes a third capacitor Cs1, a fourth capacitor Cs2, and a second switching unit 314.

A first reference voltage VREF may be applied to a first end or electrode of the first capacitor Cr1.

The first reference voltage VREF may also be applied to a first end or electrode of the second capacitor Cr2.

A second reference voltage Ramp may be applied to a first end or electrode of the third capacitor Cs1.

The second reference voltage Ramp may also be applied to a first end or electrode of the fourth capacitor Cs2.

For example, the first reference voltage VREF may be a DC voltage having a predetermined level. The second reference voltage Ramp may be a ramp voltage having a level rising or falling in accordance with passage of time.

In response to first to third switch control signals CW1 to CW3, the first switching unit 312 may connect or disconnect a second end or electrode of the first capacitor Cr1 and/or a second end or electrode of the second capacitor Cr2 to or from the output stage of the gain-variable amplifier unit 305, and in more detail, to or from the output terminal 424.

In response to fourth to sixth switch control signals CW4 to CW6, the second switching unit 314 may connect or disconnect a second end or electrode of the third capacitor Cs1 and/or a second end or electrode of the fourth capacitor Cs2 to the output terminal 424 of the gain-variable amplifier unit 305.

For example, the gain-variable amplifier unit 305 may amplify, with a first gain, the first reset sensing signal from the first unit pixel. In response to the switch control signals CW1 to CW3, the first switching unit 312 may store in the first capacitor Cr1 the first reset sensing signal amplified with the first gain. For example, in this instance, the switch control signal CW1 may close switch Sw1, and the switch control signals CW2 and CW3 may open switches Sw2 and Sw3.

In addition, the gain-variable amplifier unit 305 may amplify, with the first gain, the first image sensing signal from the first unit pixel. In response to the switch control signals CW4 to CW6, the second switching unit 314 may store in the third capacitor Cs1 the first image sensing signal amplified with the first gain. For example, in this instance, the switch control signal CW4 may close switch Sw4, and the switch control signals CW5 and CW6 may open switches Sw5 and Sw6.

The first reset sensing signal may be a signal from the first unit pixel when the first unit pixel is reset. The first image sensing signal may be a signal from the first unit pixel in accordance with an image signal.

The gain-variable amplifier unit 305 may also amplify, with a second gain, the second reset sensing signal from the second unit pixel. In response to the switch control signals CW1 to CW3, the first switching unit 312 may store in the second capacitor Cr2 the second reset sensing signal amplified with the second gain. For example, in this instance, the switch control signal CW2 may close switch Sw2, and the switch control signals CW1 and CW3 may open switches Sw1 and Sw3.

In addition, the gain-variable amplifier unit 305 may amplify, with the second gain, the second image sensing signal from the second unit pixel. In response to the switch control signals CW4 to CW6, the second switching unit 314 may store in the fourth capacitor Cs2 the second image sensing signal amplified with the second gain. For example, in this instance, the switch control signal CW5 may close switch Sw5, and the switch control signals CW4 and CW6 may open switches Sw4 and Sw6.

The second reset sensing signal may be a signal from the second unit pixel when the second unit pixel is reset. The second image sensing signal may be a signal from the second unit pixel in accordance with an image signal.

In addition, in response to the switching control signals CW1 to CW3, the first switching unit 312 may connect the second end or electrode of the first capacitor Cr1 and the second end or electrode of the second capacitor Cr2 in order to calculate or determine an average of the first reset sensing signal stored in the first capacitor Cr1 amplified with the first gain and the second reset sensing signal stored in the second capacitor Cr2 amplified with the second gain. For example, in this instance, the switch control signal CW3 may close switch Sw3, and the switch control signals CW1 and CW2 may open switches Sw1 and Sw2.

When the second end or electrode of the first capacitor Cr1 and the second end or electrode of the second capacitor Cr2 are connected, the first averaging unit 310 may generate a first binning sampling signal. In some embodiments, the first capacitor Cr1 and the second capacitor Cr2 may have the same size or capacitance.

Meanwhile, in response to the switching control signals CW4 to CW6, the second switching unit 314 may connect the second end or electrode of the third capacitor Cs1 and the second end or electrode of the fourth capacitor Cs2 in order to calculate or determine an average of the first image sensing signal stored in the third capacitor Cs1 amplified with the first gain and the second image sensing signal stored in the fourth capacitor Cs2 amplified with the second gain. For example, in this instance, the switch control signal CW6 may close switch Sw6, and the switch control signals CW4 and CW5 may open switches Sw4 and Sw5.

When the second end of the third capacitor Cs1 and the second end of the fourth capacitor Cs2 are connected, the second averaging unit 330 may generate a second binning sampling signal. In some embodiments, the third capacitor Cs1 and the fourth capacitor Cs2 may have the same size or capacitance.

The switching control signals CW1 to CW6 may be provided by the timing controller 110.

The first switching unit 132 may include first to third switches SW1 to SW3.

The first switch SW1 is connected to the second end or electrode of the first capacitor Cr1 and the output terminal 424 of the gain-variable amplifier unit 305. The first switch SW1 may open or close in response to the first switch control signal CW1.

The second switch SW2 is connected to the second end or electrode of the second capacitor Cr2 and the gain-variable amplifier unit 305 (e.g., the output terminal 424). The second switch SW2 may open or close in response to the second switch control signal CW2.

The third switch SW3 is connected to the second end or electrode of the first capacitor Cr1 and the second end or electrode of the second capacitor Cr2. The third switch SW3 may open or close in response to the third switch control signal CW3.

The second switching unit 134 may include fourth to sixth switches SW4 to SW6.

The fourth switch SW4 is connected to the second end or electrode of the third capacitor Cs1 and the sensing line 101-1. The fourth switch SW4 may open or close in response to the fourth switch control signal CW4.

The fifth switch SW5 is connected to the second end or electrode of the fourth capacitor Cs2 and the sensing line 101-1. The fifth switch SW5 may open or close in response to the fifth switch control signal CW5.

The sixth switch SW6 is connected to the second end or electrode of the third capacitor Cs1 and the second end or electrode of the fourth capacitor Cs2. The sixth switch SW6 may open or close in response to the sixth switch control signal CW6.

Each of the unit pixels P11 to Pnm of the pixel array 120 may have the same configuration.

FIG. 5 illustrates an exemplary circuit diagram for the unit pixel P11 illustrated in FIG. 1.

Referring to FIG. 5, the unit pixel P11 may include a photodiode 210, a transfer transistor 220, a reset transistor 230, a driver transistor 240, and a select transistor 250.

The photodiode 210 is connected to a first voltage GND and the transfer transistor 220. The photodiode 210 may absorb light and generate charges from the absorbed light. For example, the first voltage GND may be a ground voltage.

The transfer transistor 220 is connected to a floating node FD and the photodiode 210. The transfer transistor 220 may be controlled by a transfer signal TX from the timing controller 110.

In response to the transfer signal TX, the transfer transistor 220 may transfer charges generated by the photodiode 210 to the floating node FD. In this case, the floating node FD may be a floating diffusion region in a semiconductor substrate.

The reset transistor 230 is connected to a second voltage VDD and the floating node FD. The reset transistor 230 may be controlled by a reset signal RX from the timing controller 110. The reset transistor 230 may reset the unit pixel in response to the reset signal RX.

For example, when the reset transistor 230 turns on, the second voltage VDD may be applied to the floating node FD. In accordance with application of the second voltage VDD, charges at the floating node FD may be removed and, as such, the floating node FD may be reset.

The driver transistor 240 is connected to the second voltage VDD and a first source/drain terminal of the select transistor 250 (for example, a source or a drain). The driver transistor 240 is connected at its gate to the floating node FD.

The driver transistor 240 may be controlled in response to a voltage at the floating node FD. The driver transistor 240 may constitute a source follower, along with a current source 260 outside the unit pixel P11. In this case, the driver transistor 240 may function as a buffer.

The select transistor 250 is connected to the driver transistor 240 and the current source 260 outside the unit pixel P11. The select transistor 250 may select the corresponding unit pixel of the pixel array 120 (e.g., the unit pixel P11) in response to a select signal SX configured to select unit pixels of the pixel array 120 on a row basis.

The source of the select transistor 250 may be an output terminal 201-1 of the unit pixel P11 and, as such, may be connected to the sensing line 101-1. In this case, a sensing signal, for example, a reset sensing signal or an image sensing signal, may be output from the output terminal 201-1 of the select transistor 250.

The analog-to-digital converter 140 converts analog signals from the binning sampling unit 130 (e.g., the first binning sampling signal B11, B21 ... Bm1 and the second binning sampling signal B12, B22 ... Bm2) into digital signals. The digital signals represent a low-resolution signal from two (or more) unit pixels in the same column, preferably having the same color.

For example, the analog-to-digital converter 140 may generate digital signals, using the first binning sampling signal (e.g., B11, B21 ... Bm1) from the first averaging unit 310 and the second binning sampling signal (e.g., B12, B22 ... Bm2) from the second averaging unit 320.

For example, the analog-to-digital converter 140 may compare the first binning sampling signal (e.g., B11, B21 ... Bm1) with the second binning sampling signal (e.g., B12, B22 ... Bm2), and may output a comparison signal (e.g., according to the comparison). The analog-to-digital converter 140 may perform a counting operation to generate the comparison signals, and may generate a digital code based on the counting operation.

The analog-to-digital converter 140 may perform correlated double sampling (CDS) to remove intrinsic fixed pattern noise from the pixels.

In various embodiments, weighted averaging may be performed on the reset sensing signals and image sensing signals from two different unit pixels in the same column by the gain-variable amplifier unit 305 and binning sampling unit 130 before the above-described analog-to-digital conversion. Accordingly, it is unnecessary to provide a separate line memory for binning after analog-to-digital conversion. In addition, it may be possible to reduce the number of analog-to-digital conversion operations, thereby achieving an enhancement in the analog-to-digital conversion rate.

The embodiments as described above may include particular features, structures, or characteristics, but not every embodiment necessarily includes the particular features, structures, or characteristics. Furthermore, the particular features, structures or characteristics in various embodiments may be combined in any suitable manner, as would be apparent to one of ordinary skill in the art from this disclosure, in one or more other embodiments. Therefore, combinations of features of different embodiments are meant to be within the scope of the invention.

What is claimed is:

1. An image sensor comprising:
    a pixel array comprising a plurality of unit pixels in a matrix having rows and columns;
    a gain-variable amplifier unit configured to amplify reset sensing signals and image sensing signals output from two or more unit pixels selected from the unit pixels in each of the columns;
    a first averaging unit configured to output a first binning sampling signal according to an average of the reset sensing signals;
    a second averaging unit configured to output a second binning sampling signal according to an average of the image sensing signals; and
    an analog-to-digital converter configured to convert the first binning sampling signal and the second binning sampling signal to digital signals,
    wherein the gain-variable amplifier unit comprises a light sensor configured to measure a luminosity of input light and generate a digital code,
    the gain-variable amplifier unit generates gain control signals based on the digital code, and
    the gain-variable amplifier unit amplifies a reset sensing signal and an image sensing signal from each of the selected unit pixels with a different gain in response to the gain control signals.

2. The image sensor according to claim 1, wherein the selected unit pixels have a same color.

3. The image sensor according to claim 1, wherein the gain-variable amplifier unit amplifies, with a first gain in response to the gain control signals, a first reset sensing signal and a first image sensing signal from a first one of the selected unit pixels, and amplifies, with a second gain in response to the gain control signals, a second reset sensing signal and a second image sensing signal from a second one of the selected unit pixels, wherein the first gain and the second gain are different.

4. The image sensor according to claim 1, wherein the gain-variable amplifier unit comprises:
    a primary amplifier configured to amplify the reset sensing signals and the image sensing signals from the selected unit pixels, and output a first amplified signal;
    a first variable capacitor configured to receive at a first end or electrode the signals from the selected unit pixels, the first variable capacitor being connected at a second end or electrode to an input terminal of the primary amplifier;

a secondary amplifier configured to amplify the first amplified signal and output a second amplified signal; and a second variable capacitor connected to the input terminal of the primary amplifier and an output terminal of the secondary amplifier.

5. The image sensor according to claim 4, wherein the gain-variable amplifier unit further comprises a bandwidth varying unit configured to vary a bandwidth of the gain-variable amplifier unit.

6. The image sensor according to claim 5, wherein:
the bandwidth varying unit comprises a plurality of capacitors and a plurality of switches;
each of the capacitors is connected at a first end or electrode to the output terminal of the secondary amplifier;
each of the switches is connected to a second end or electrode of a corresponding one of the capacitors and a first node; and
the first node is connected to an output terminal of the primary amplifier and an input terminal of the secondary amplifier.

7. The image sensor according to claim 6, wherein the bandwidth varying unit further comprises a reset switch connected to the input terminal of the primary amplifier and the output terminal of the secondary amplifier.

8. The image sensor according to claim 1, wherein the analog-to-digital converter generates a digital signal using the first binning sampling signal and the second binning sampling signal.

9. An image sensor comprising:
a pixel array comprising a plurality of unit pixels in a matrix having rows and columns;
a gain-variable amplifier unit configured to amplify, with a first gain, a first signal from a first one of two unit pixels selected from the unit pixels in each of the columns, and amplifying, with a second gain, a second signal from a second one of the selected unit pixels;
an averaging unit configured to calculate or determine an average of the first signal amplified with the first gain and the second signal amplified with the second gain, and output a binning sampling signal; and
an analog-to-digital converter configured to convert the binning sampling signal to a digital signal,
wherein the gain-variable amplifier unit comprises a light sensor configured to measure a luminosity of input light and generate a digital code,
the gain-variable amplifier unit generates bandwidth control signals based on the digital code,
the gain-variable amplifier unit is configured to amplify the first signal with the first gain in response to the bandwidth control signals,
the gain-variable amplifier unit is configured to amplify the second signal with the second gain in response to the bandwidth control signals, and
the first gain and the second gain are different.

10. The image sensor according to claim 9, wherein the gain-variable amplifier unit comprises:
a primary amplifier configured to amplify the first signal and the second signal;
a first variable capacitor configured to receive at a first end or electrode the first signal and the second signal, the first variable capacitor being connected at a second end or electrode to an input terminal of the primary amplifier;
a secondary amplifier configured to amplify the amplified first signal and the amplified second signal;
a second variable capacitor connected to the input terminal of the primary amplifier and an output terminal of the secondary amplifier; and
a bandwidth varying unit configured to vary a bandwidth of the secondary amplifier.

11. The image sensor according to claim 10, wherein:
the bandwidth varying unit comprises a plurality of capacitors and a plurality of switches;
each of the capacitors is connected at a first end or electrode to the output terminal of the secondary amplifier;
each of the switches is connected to a second end of a corresponding one of the capacitors and a first node; and
the first node is connected to an output terminal of the primary amplifier and an input terminal of the secondary amplifier.

12. The image sensor according to claim 11, wherein the bandwidth varying unit further comprises a bandwidth control signal generator configured to generate the bandwidth control signals to control the switches, based on a gain reset signal and the digital code.

13. The image sensor according to claim 12, wherein the bandwidth control signal generator comprises:
logic gates configured to perform a logic operation on the gain reset signal and the digital code, and generating the bandwidth control signals according to the logical operation.

14. The image sensor according to claim 13, wherein the light sensor generates the digital code from the measured luminosity of the input light.

15. The image sensor according to claim 12, wherein the bandwidth varying unit further comprises a reset switch connected to the input terminal of the primary amplifier and the output terminal of the secondary amplifier, the bandwidth varying unit opening or closing in response to the gain reset signal.

* * * * *